US009785243B2

(12) United States Patent
Kawalkar

(10) Patent No.: US 9,785,243 B2
(45) Date of Patent: Oct. 10, 2017

(54) SYSTEM AND METHOD FOR PROVIDING AN ERGONOMIC THREE-DIMENSIONAL, GESTURE BASED, MULTIMODAL INTERFACE FOR USE IN FLIGHT DECK APPLICATIONS

(71) Applicant: HONEYWELL INTERNATIONAL INC., Morristown, NJ (US)

(72) Inventor: Amit Nishikant Kawalkar, Bangalore (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 168 days.

(21) Appl. No.: 14/168,426

(22) Filed: Jan. 30, 2014

(65) Prior Publication Data

US 2015/0212581 A1    Jul. 30, 2015

(51) Int. Cl.
*G06F 3/01* (2006.01)
*B64C 19/00* (2006.01)
*B64C 13/04* (2006.01)

(52) U.S. Cl.
CPC .............. *G06F 3/017* (2013.01); *B64C 13/04* (2013.01); *B64C 19/00* (2013.01)

(58) Field of Classification Search
CPC ...... G06F 3/017; G06F 3/011; G06F 3/04815; G06F 3/0304; G06F 3/0425; G06F 3/0325; G06F 3/0346; B64D 11/00; B64C 13/06
See application file for complete search history.

(56) References Cited

U.S. PATENT DOCUMENTS

| | | | |
|---|---|---|---|
| 6,276,211 | B1 | 8/2001 | Smith |
| 8,089,483 | B2 | 1/2012 | Tanaka |
| 8,111,239 | B2 | 2/2012 | Pryor et al. |
| 8,230,367 | B2 | 7/2012 | Bell et al. |
| 8,451,236 | B2 | 5/2013 | Duarte et al. |
| 2002/0036617 | A1 | 3/2002 | Pryor |
| 2005/0275638 | A1* | 12/2005 | Kolmykov-Zotov ...... G06F 3/04883 345/179 |
| 2010/0107099 | A1 | 4/2010 | Frazier et al. |
| 2010/0234094 | A1 | 9/2010 | Gagner et al. |
| 2011/0069019 | A1 | 3/2011 | Carpendale et al. |

(Continued)

FOREIGN PATENT DOCUMENTS

| | | |
|---|---|---|
| EP | 2600108 A1 | 6/2013 |
| EP | 2620863 A2 | 7/2013 |

(Continued)

OTHER PUBLICATIONS

EP Search Report for Application No. 14169549.4 dated Nov. 10, 2014.

(Continued)

*Primary Examiner* — Sang H Kim
(74) *Attorney, Agent, or Firm* — Lorenz & Kopf, LLP

(57) ABSTRACT

A system and method for operating an aircraft in response to input gestures is provided. The method is comprised of generating a valid interaction volume substantially surrounding a user's hand, based on the location of the user's arm and hand relative to a pilot support apparatus, recognizing when a gesture performed within the valid interaction volume indicates a valid input, and generating an associated system command.

17 Claims, 10 Drawing Sheets

(56) References Cited

U.S. PATENT DOCUMENTS

| | | | |
|---|---|---|---|
| 2011/0127380 A1* | 6/2011 | Orgerie | B64D 11/0015 244/118.5 |
| 2011/0193939 A1* | 8/2011 | Vassigh | G06F 3/011 348/46 |
| 2011/0216060 A1 | 9/2011 | Weising et al. | |
| 2011/0296353 A1* | 12/2011 | Ahmed | G06F 3/017 715/848 |
| 2012/0235904 A1 | 9/2012 | Plagemann et al. | |
| 2012/0280901 A1 | 11/2012 | Kim | |
| 2012/0327125 A1 | 12/2012 | Kutliroff et al. | |
| 2013/0265220 A1* | 10/2013 | Fleischmann | G06F 3/017 345/156 |
| 2013/0331993 A1* | 12/2013 | Detsch | G05B 15/02 700/275 |
| 2014/0071037 A1* | 3/2014 | Cohen | G06K 9/00348 345/156 |
| 2014/0198954 A1* | 7/2014 | Bulzacki | G06K 9/00342 382/103 |
| 2014/0358332 A1* | 12/2014 | Colmenares | G06F 3/017 701/3 |
| 2015/0035750 A1* | 2/2015 | Bailey | G06F 3/0346 345/158 |

FOREIGN PATENT DOCUMENTS

| | | | |
|---|---|---|---|
| EP | 2741171 A1 | 6/2014 | |
| WO | 2010105084 A1 | 9/2010 | |
| WO | 2011017474 A1 | 2/2011 | |
| WO | 2013018099 A2 | 2/2013 | |

OTHER PUBLICATIONS

USPTO Office Action, Notification Date May 8, 2015; U.S. Appl. No. 13/915,232.

USPTO Office Action, Notification Date Dec. 26, 2014; U.S. Appl. No. 13/915,232.

EP Extended Search Report for Application No. 15151683.8; Dated Jun. 30, 2015.

"Cockpit Gesture Recognition," Ratan Software URL:http://www.rattansoftware.com/reasearch/cockpit-gestures-recognition/ [Retreived from internet:], Jan. 1, 2013.

Grossman, T.: "Hover Widgets: Using the Tracking State to Extend the Capabilities of Pen-Operated Devices" CHI 2006, Apr. 22-28, 2006, Montréal, Québec, Canada.

Apple Wins Patents for Wild 3D Gesturing, Autofocus & More, Jul. 31, 2012; URL: http://www.patentlyapple.com/patently-apple/2012/07/apple-wins-patents-for-wild-3d-gesturing-autofocus-more.html.

Omek Gesture Recognition and Tracking Technology; Keep your hands where I can see them: Designing for Touch-Free Interaction; Jun. 4, 2013.

Jianming Guo; Hand Gesture Recognition and Interaction with 3D Stereo Camera; COMP8740 Project Report; Department of Computer Science Australian National University, Nov. 2011.

Kai Nickel, et al.; Recognition of 3D-Pointing Gestures for Human-Robot-Interaction; Universitat Karlsruhe (TH), Germany.

Daniela G. Trevisan, et al.; Supporting the Design of Multimodal Interactions: A Case Study in a 3D Sculpture Application; XII Symposium on Virtual and Augmented Reality, Natal, RN, Brazil—May 2010.

Verifying Advantages of Two-Handed Interaction, hoofdstuk 4 Aug. 25, 1999; pp. 123-152.

USPTO Office Action for U.S. Appl. No. 13/915,232; Notification date Sep. 11, 2015.

EP Communication for Application No. 14 169 549.4-1959 dated Jan. 12, 2016.

USPTO Office Action for U.S. Appl. No. 13/915,232 dated Jan. 4, 2016.

EP Summons for Application No. 14169549.4-1959/2813920 dated Sep. 15, 2016.

Jean-Noel Perbet, et al.; Interactive Display Concept for the Next-Generation Cockpit, Publication Date May 6, 1991.

USPTO Office Action for U.S. Appl. No. 13/915,232 dated Aug. 16, 2016.

USPTO Notice of Allowance and Fee(s) due for U.S. Appl. No. 13/915,232 dated Feb. 10, 2017.

* cited by examiner

SYSTEM AND METHOD FOR PROVIDING AN ERGONOMIC THREE-DIMENSIONAL, GESTURE BASED, MULTIMODAL INTERFACE FOR USE IN FLIGHT DECK APPLICATIONS

TECHNICAL FIELD

Embodiments of the subject matter described herein relate generally to computer aviation systems. More particularly, embodiments of the subject matter described herein relate to a system and method for providing an ergonomic three-dimensional, gesture based, multimodal interface for use in flight deck applications.

BACKGROUND

New and innovative methods of interacting with computers are being developed to increase usability of computers. For example touch screen interfaces have been introduced that allow users to provide commands to a computer without a mouse and/or keyboard. However, some of these new methods are vulnerable to interpreting inadvertent user interactions as commands; such inadvertent interactions may be defined as any interaction detected by the touch screen interface without the user's consent. Inadvertent interactions may be caused by bumps, vibrations, accidental brushes by a user's hand or other physical objects, or the like, and may result in system malfunctions or operational errors.

An interface that is currently being developed, which provides greater immunity to inadvertent user interaction, is a gesture recognition interface. Gestures are generally hand movements. As referenced herein, a gesture has specific motion dynamics and is composed of one or more static or dynamic components of a user's palm and fingers. However, adoption of the gesture recognition interface also has constraints, such as requiring a high degree of preprocessing and complex algorithms to extract and analyze the user's interaction from the surrounding environment.

Gesture recognition interfaces depend upon three-dimensional (3D) imaging information sensed across an established visible sensing, volumetric, range. An extensive visible sensing range limits the accuracy, reliability, and precision of the system, and presents significant technology challenges for aircraft flight deck applications.

One proposed method of avoiding these issues relies on a user to hold or otherwise manipulate a controller or handheld device. These controllers may act as an extension of the body so that when a gesture is performed, the motions can be recognized by the system. However, in addition to requiring the user to hold a controller or other device in order to interact with a processor, only limited types of motions are recognized by the system.

To overcome some of the disadvantages of the aforementioned methods, a volumetric computing system has been proposed for use on, for example, an aircraft flight deck, to reduce inadvertent user interactions. A sensor is placed proximate a display device that is coupled to an interaction controller. This volumetric computing system enables users or developers to interact with the system to activate control functions without making physical contact with the system. An example of such a system is shown and described in U.S. patent application Ser. No. 13/777,737 filed Feb. 26, 2013 entitled "SYSTEM AND METHOD FOR INTERACTING WITH A TOUCH SCREEN INTERFACE UTILIZING A HOVER GESTURE CONTROLLER," and assigned to the instant assignee, the teachings of which are hereby incorporated by reference. The system of the above patent application represents a significant improvement over the prior art.

Impediments to wide adoption of 3D gesture interfaces remain. Perhaps the most significant impediment to the wide adoption of 3D gesture interfaces resides in the need for the user to raise his or her arms and hands in order to input gestures into the system. This is tiresome, and diminishes the appeal of the interface. Another drawback is that the interacting hand is often in the user's line of sight. Users generally prefer to minimize any visual fixation on the interacting hand, and to be able to sit, with the arm of the interacting hand on arm-rest. Yet another drawback is that a system relying on one, extended, sensor volume to generate multiple valid 3D gesture interaction volumes for multiple users may be vulnerable to inadvertent or unintentional gesture input. The aforementioned preferences and vulnerabilities may hinder the practicality of the current gesture recognition systems in certain applications. Utilizing individual ergonomic and anthropometric measurements (for example, arm length, seat height, arm-rest height, and the like) to accommodate user preferences is desirable and would address some of the impediments to adoption of 3D gesture interfaces.

In view of the foregoing, an ergonomic three-dimensional, gesture based, multimodal interface for use in flight deck applications is desirable, this interface is hereinafter referred to as a "3D gesture interaction interface." It would be desirable for the interface to operate when the pilot's arm is supported on an arm-rest, and function while the interacting hand is not in the line of sight of the pilot; these interactions are sometimes referred to as 'arm-rest-support-gesture-interactions'. It would further be desirable for the interface construct a valid 3D gesture interaction volume (hereinafter referred to as "valid interaction volume") either automatically (automatic mode) or by allowing the pilot to interact and customize according to ergonomic and anthropometric requirements and preferences (pilot-driven mode). In addition to reducing the probability of inadvertent activations of control functions, these improvements would reduce fatigue, improve productivity, and enhance the user's overall experience.

BRIEF SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

A method is provided for operating an aircraft. A valid interaction volume substantially surrounding a user's hand is generated based on the location of a user's arm and hand relative to a pilot support apparatus. The method recognizes when a gesture performed within the valid interaction volume indicates a valid gesture input, and generates an associated system command.

Also provided is a volumetric computing system onboard an aircraft. The system includes a pilot support apparatus, a sensor, a display device, and a processor. The processor is coupled to the pilot support apparatus, the sensor, and the display. Based on the location of a user's arm and hand relative to the pilot support apparatus, the processor is configured to generate a valid interaction volume substantially surrounding the user's hand. The processor is also configured to recognize when a gesture performed within the valid interaction volume indicates a valid gesture input, and generate an associated system command.

Also provided is a method for operating an aircraft. The method positions, with respect to at least one sensor, an arm-rest that is coupled to a chair. The method then constructs a predetermined sensor volume based on the positions and locations of the chair, the arm-rest and the at least one sensor. Based on the location of a user's arm and hand relative to the predetermined sensor volume, the method generates a valid interaction volume substantially surrounding the user's hand. The static and dynamic movements of the user's palm and fingers within the valid interaction volume are analyzed. When the static and dynamic movements of the user's palm and fingers within the valid interaction volume indicate a valid gesture input, the valid gesture input is recognized.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following detailed description and claims when considered in conjunction with the following figures, wherein like reference numerals refer to similar elements throughout the figures, and wherein:

DETAILED DESCRIPTION

Figure 1:
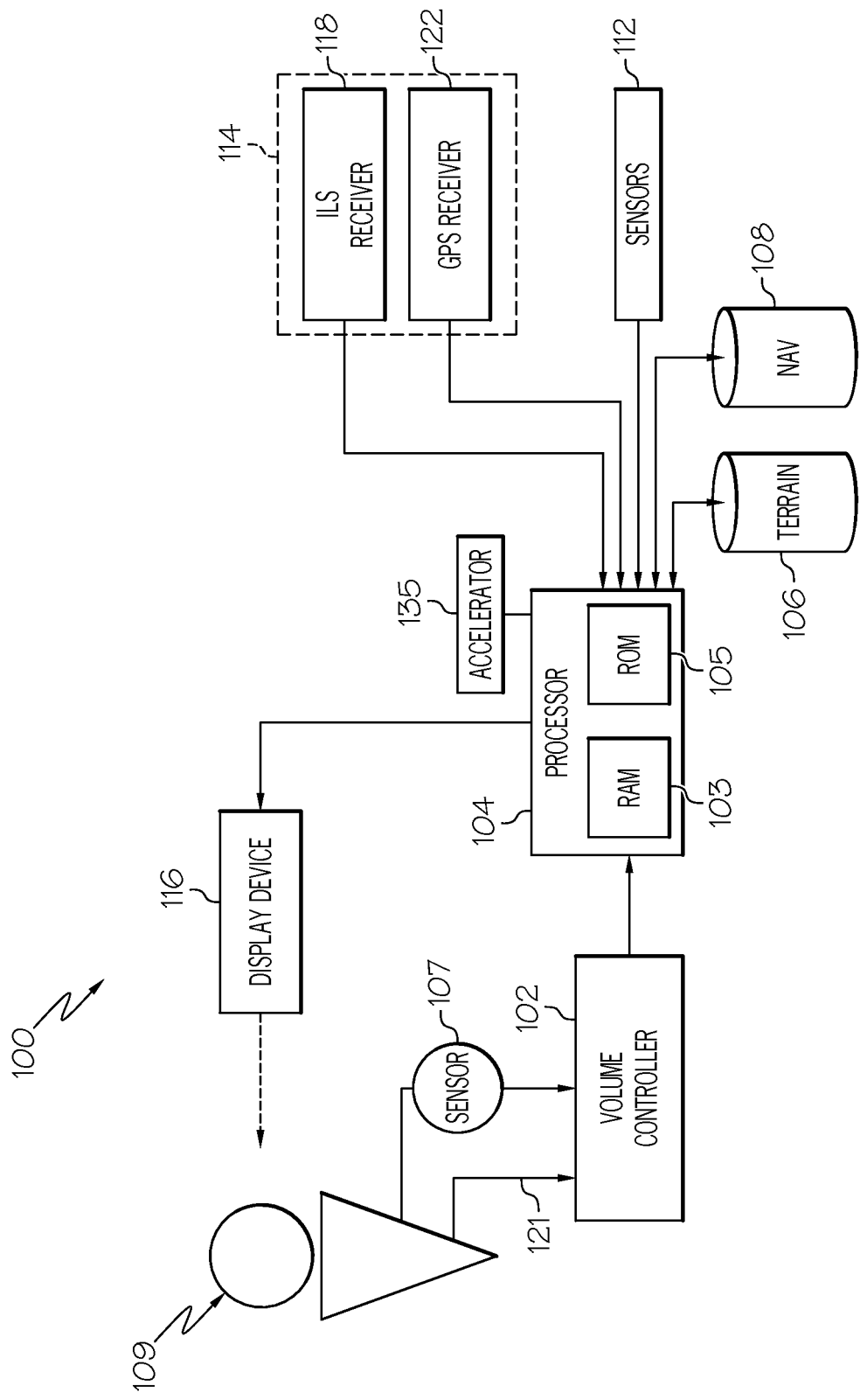
FIG. 1 is a block diagram of an aircraft cockpit system including a display and a volume controller.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, sensors, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Disclosed herein is a novel, ergonomic three-dimensional, gesture based, multimodal interface for use in flight deck applications, which reduces user fatigue and gesture-input cross-talk. This interface is herein referred to as "3D gesture interaction interface". The 3D gesture based interface comprises a sensor placed proximate to an arm-rest, and the sensor is coupled to a gesture interaction controller. The 3D gesture interaction interface enables users or developers to interact with the computer system to activate control functions without making physical contact with the system. This interface extends the system beyond the limits of a particular operating system or application to which the user's inputs are directed. Presented herein for purposes of explication are certain exemplary embodiments illustrating how the 3D gesture interaction interface may be employed. For example, the embodiment of a 3D gesture interaction interface suitable for use in aviation applications will be discussed.

Described below is an explicated example embodiment, which is merely an example and a guide for implementing the novel systems and method herein on any user interface in any industrial, commercial, aviation, or consumer electronics application. As such, the examples presented herein are intended as non-limiting.

Figure 4:
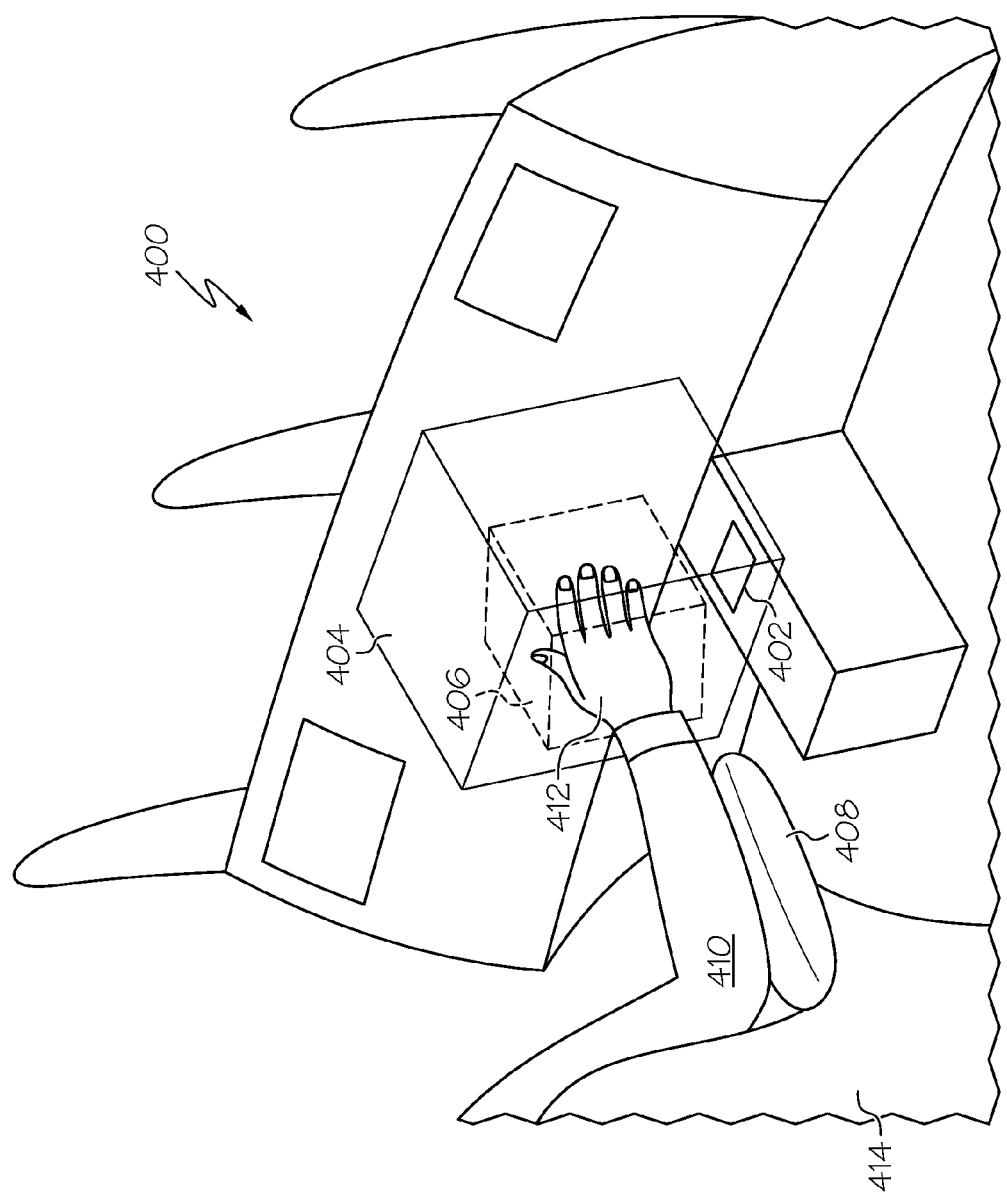
FIG. 4 is an illustration of an aircraft cockpit showing a 3D sensor, the corresponding 3D sensor volume, and a valid interaction volume.

FIG. 1 is a block diagram of an aircraft cockpit system including a display and a volume controller. Aircraft cockpit system 100 includes a volume controller 102, a processor 104, one or more terrain databases 106 sometimes referred to as a Terrain Avoidance and Warning System (TAWS), one or more navigation databases 108, sensors 112, external data sources 114, and at least one display device 116. The volume controller 102 is in operable communication with the processor 104 and is configured to receive input from at least one sensor 107, and a user 109 (e.g. pilot, co-pilot, flight crew, and etc.) and, in response to the user input, supplies command signals to the processor 104. The volume controller 102 generates the sensor volume 404 and the valid interaction volume 406, both of which are shown in FIG. 4.

The processor 104 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. In the depicted embodiment, the processor 104 includes on-board RAM (random access memory) 103, and on-board ROM (read-only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. The software executing the exemplary embodiment is stored in either the ROM 105 or the RAM 103. It will be appreciated that this is merely exemplary of one scheme for storing operating system software and software routines, and that various other storage schemes may be implemented.

The memory devices shown as RAM 103 and ROM 105 may be realized as RAM memory, flash memory, EPROM memory, EEPROM memory, registers, a hard disk, a removable disk, a CD-ROM, or any other form of storage medium known in the art. In this regard, the memory devices can be coupled to the processor 104 such that the processor 104 can read information from, and write information to, the memory devices. In the alternative, memory devices may be integral to the processor 104. As an example, the processor 104 and the memory devices shown as RAM 103 and ROM 105 may reside in an ASIC. In practice, a functional or logical module/component of the aircraft cockpit system 100 might be realized using program code that is maintained in the memory devices. For example, the memory devices shown as RAM 103 and ROM 105 can be used to store data utilized to support the operation of the aircraft cockpit system 100, as will become apparent from the following description.

No matter how the processor 104 is specifically implemented, it is in operable communication with the terrain databases 106, the navigation databases 108, and at least one display device 116, and is coupled to receive various types of inertial data from the sensors 112, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display device 116. The display device 116, in response to the display commands, selectively renders various types of textual, graphic, and/or iconic information.

The terrain databases 106 include various types of data representative of the terrain over which the aircraft is flying, and the navigation databases 108 include various types of navigation-related data. The sensors 112 may be implemented using various types of inertial sensors, systems, and or subsystems, now known or developed in the future, for supplying various types of inertial data, for example, representative of the state of the aircraft including aircraft speed, heading, and altitude. The ILS receiver 118 provides aircraft with horizontal (or localizer) and vertical (or glide slope) guidance just before and during landing and, at certain fixed points, indicates the distance to the reference point of landing on a particular runway. The GPS receiver 124 is a multi-channel receiver, with each channel tuned to receive one or more of the GPS broadcast signals transmitted by the constellation of GPS satellites (not illustrated) orbiting the earth.

The display device 116, as noted above, in response to commands supplied from the processor 104, selectively renders various textual, graphic, and/or iconic data, and thereby supplies visual feedback to the user 109. It will be appreciated that the display device 116 may be implemented using any one of numerous known display devices suitable for rendering textual, graphic, and/or iconic information in a format viewable by the user 109. Non-limiting examples of such display devices include various multifunction displays (MFD), Near to Eye (NTE), projection displays, cathode ray tube (CRT) displays, and flat screen displays such as LCD (liquid crystal display) and TFT (thin film transistor) displays. The display device 116 may additionally be implemented as a screen mounted display, or any one of numerous known technologies. It is additionally noted that the display device 116 may be configured as any one of numerous types of aircraft flight deck displays. For example, it may be configured as a multifunction display, a horizontal situation indicator, a vertical situation indicator, or the like. In the depicted embodiment, however, at least one display device 116 is configured as a primary flight display (PFD).

In operation, the display device 116 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other well-known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display device 116 is suitably designed to process data obtained from the sources of flight status data in the manner described in more detail herein.

Figure 2:
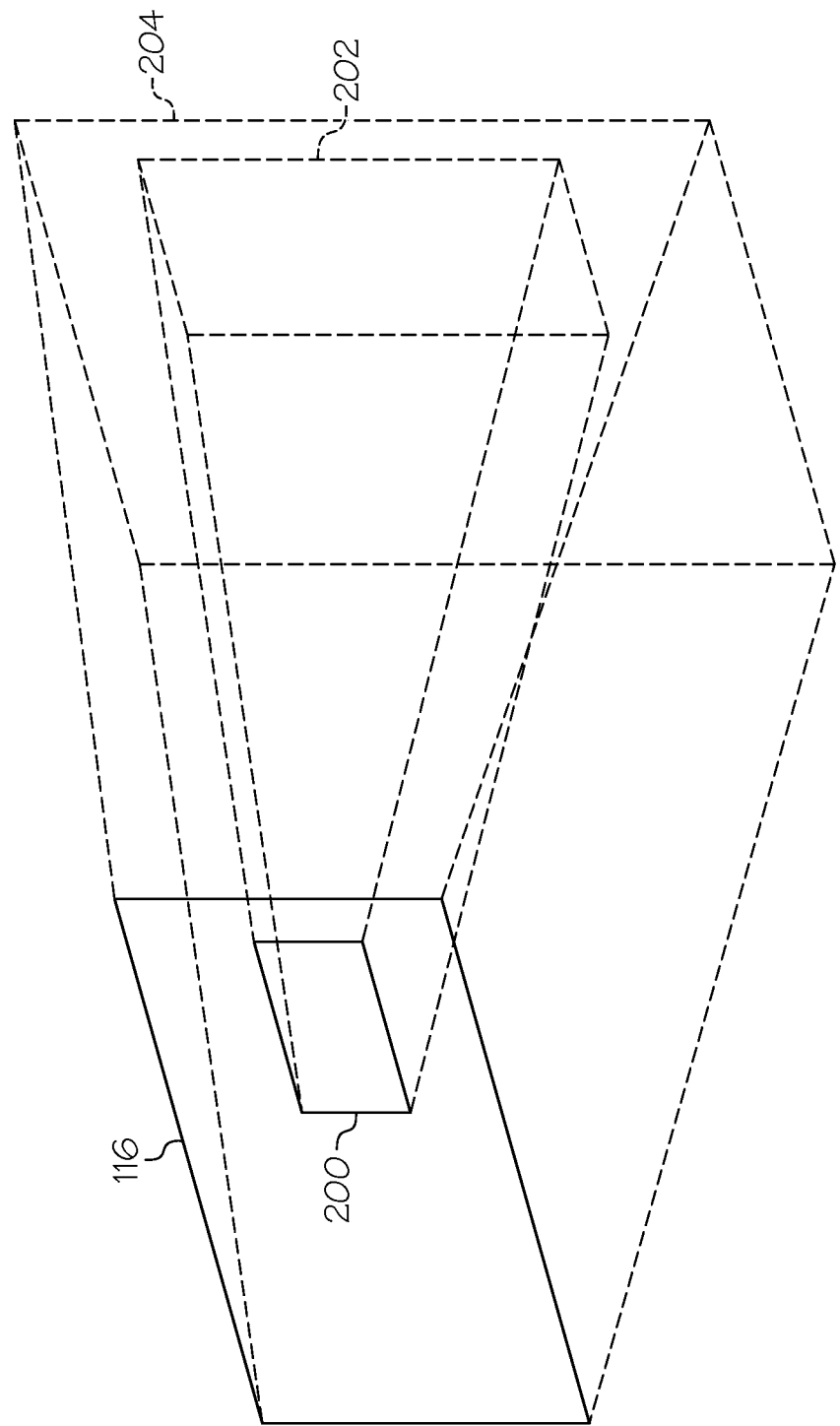
FIG. 2 is an isometric view of a volumetric computing solution.

FIG. 2 illustrates an isometric view of a volumetric computing solution according to a previous proposal. An exemplary embodiment of a volume of interaction has been projected into the space in front of the display device 116. Display device 116 renders region 200 that controls functions of the aircraft as described above. Volume 202 represents the 3D gesture interaction space corresponding to region 200. Volume 202 is a subset of the entire volume 204 that corresponds to the display device 116. Multiple interaction volumes may be present within volume 204. The proposed volumetric computation engine divides the sensed user interactions according to the location of one or more users and the boundaries of one or more volumes of interaction such as 202. The proposed volumetric computation engine is described in U.S. patent application Ser. No. 13/777,737 filed Feb. 26, 2013 entitled "SYSTEM AND METHOD FOR INTERACTING WITH A TOUCH SCREEN INTERFACE UTILIZING A HOVER GESTURE CONTROLLER," and assigned to the instant assignee, the teachings of which are hereby incorporated by reference.

Figure 3:
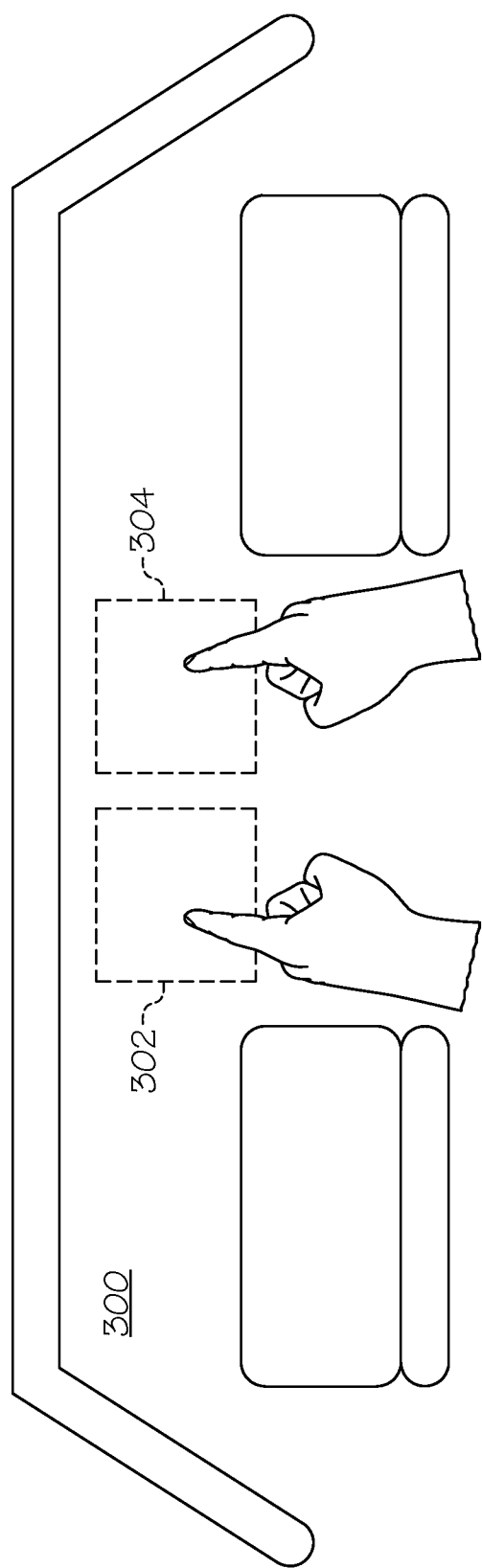
FIG. 3 is an illustration of an aircraft cockpit, showing the locations for a captain's valid interaction volume, and a first officer's valid interaction volume.

FIG. 3 is an illustration of an aircraft cockpit 300, showing the locations for a captain's valid interaction volume 302, and a first officer's valid interaction volume 304. The 3D gesture interaction interface generates private gesture interaction volumes for each user, for example, a private gesture interaction volume for the captain and a private gesture interaction volume for the first officer. The 3D gesture interaction interface enables users to interact with the flight deck systems by resting the arm of the interacting hand on an arm-rest.

FIG. 4 is an illustration of an aircraft cockpit 400 showing a 3D sensor 402 and a corresponding sensor volume 404. The user's arm 410 is shown resting on arm-rest 408 of chair 414. 3D valid interaction volume 406 is shown substantially surrounding the user's hand 412. Valid interaction volume 406 is generated corresponding to the user's hand ergonomics and anthropometrics, and is a subset of sensor volume 404. For the sake of simplification, sensor volume 404 and valid interaction volume 406 are drawn as cubes, as if their boundaries are distinct. In practice, and sensor volume 404 and valid interaction volume 406 have edges that taper off instead of being distinctly bounded.

The 3D sensor 402 may be a potentiometer, optical technology, LIDAR, SONAR, electric field imaging sensor, or a similar device. At least one 3D sensor 402 may be used to detect various relevant data, such as, but not limited to: the position and location of a palm and fingers, gestures made by the palm and fingers, the position and location information a chair from the flight deck dashboard, the position and location of an arm-rest from the flight deck dashboard. The 3D sensor(s) provide relevant data to the 3D gesture interaction interface described in more detail hereinbelow.

Figure 5:
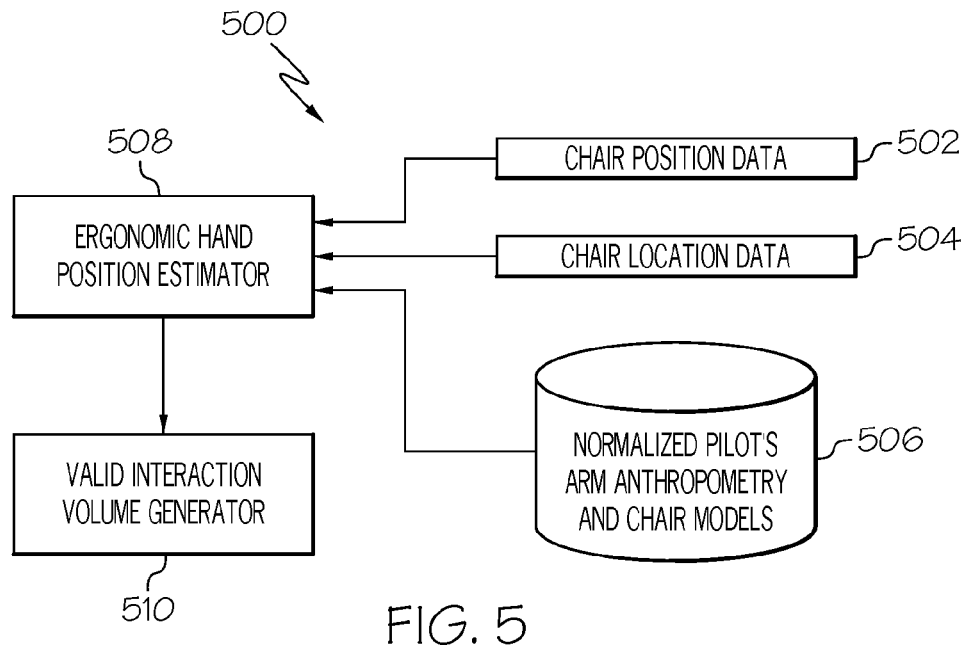
FIG. 5 is a generalized block diagram for the automatic mode of construction of a valid interaction volume.

FIG. 5 is a generalized block diagram 500 of a system for the construction of a valid interaction volume in the automatic mode. An ergonomic hand position estimator 508 receives sensor data and chair position data 502 at a first input, chair location data 504 at a second input, and normalized pilot's arm anthropometry and chair models from memory device 506. Ergonomic hand position estimator 508 drives a valid interaction volume generator 510.

The automatic mode of construction of a valid interaction volume generates a predefined valid interaction volume (for example, valid interaction volume 406 in FIG. 4) based on the pilot's seating position. The valid interaction volume is generated to be near the pilot's seating position and attributes gestures as valid, intentional and ergonomic. Any gestures falling outside of the valid interaction volume are treated as accidental or spurious even if the gestures are within the sensor's volumetric range (for example, 3D sensor volume 404 in FIG. 4).

Chair position data 502 is obtained from a sensor such as sensor 402 in FIG. 4 and sensor 402 may also distinguish between the locations of the captain's chair and the first officer's chair. The ergonomic hand position estimator 508 drives the valid interaction volume generator 510 based on chair location data 504, chair position data 502, and normalized arm anthropometry and chair models obtained from memory device 506.

Memory device 506 stores normalized arm anthropometry and chair models for construction of a valid interaction volume for a specific flight deck. The models stored in memory device 506 are not pilot specific; instead they are generalized to take into account normalized dimensions associated with the fifth percentile of males and the ninety fifth percentile of females.

Figure 6:
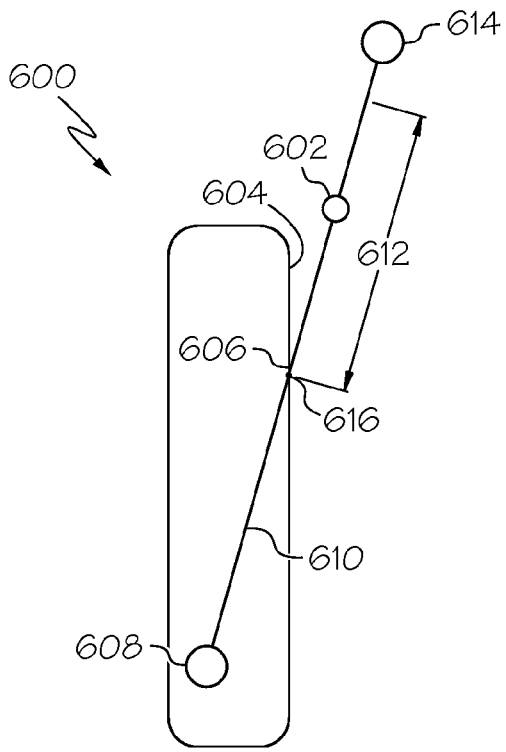
FIG. 6 is an illustration showing features of a normalized arm anthropometry model.

FIG. 6 is an illustration showing some of the features 600 of the normalized arm anthropometry model. An arm-rest is shown as object 610. A generalized arm length, extending from elbow contact point 608 to top of palm 614, includes a palm bottom joint 602 and a normalized arm and arm-rest intersection point 606. The normalized angle between the hand at neutral position and the armrest is shown at 604. A normalized arm length from the intersection point 606 of the arm and the arm and arm-rest is shown at arrow 612. In addition to the features shown, the model includes a normalized palm "portion," shown in FIG. 8 below; normalized lateral movement of the palm with respect to the palm bottom joint, calculated by the gesture interaction model; and a normalized vertical movement of the palm with respect to the palm bottom joint, also calculated by the gesture interaction model.

Figure 7:
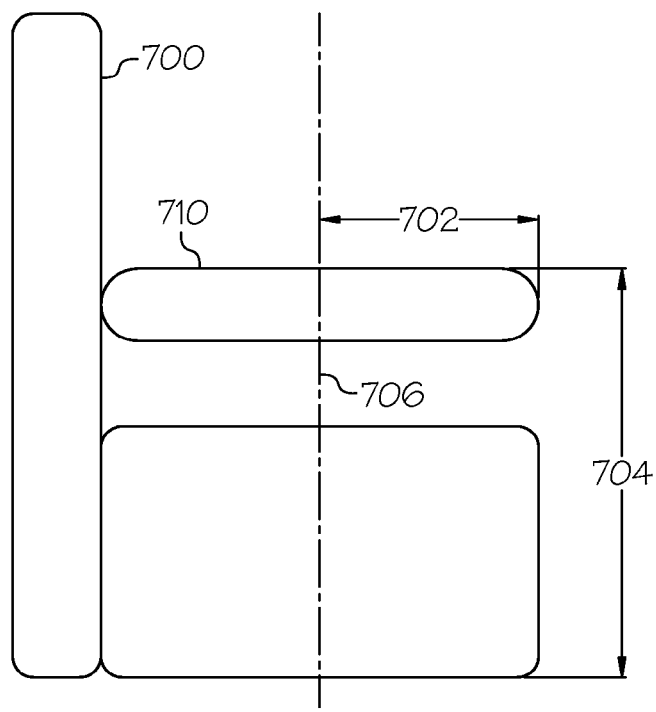
FIG. 7 is an illustration showing features of a chair model.

FIG. 7 is an illustration showing features of the chair model. Chair 700 is coupled to arm-rest 710. The length of the arm-rest extending past elbow contact point, shown as length 702 and the height of the arm-rest, 704, are also shown. Also included in the chair model are chair position and location data, based upon a substantially central point of the chair with respect to the flight deck dashboard 706.

Figure 8:
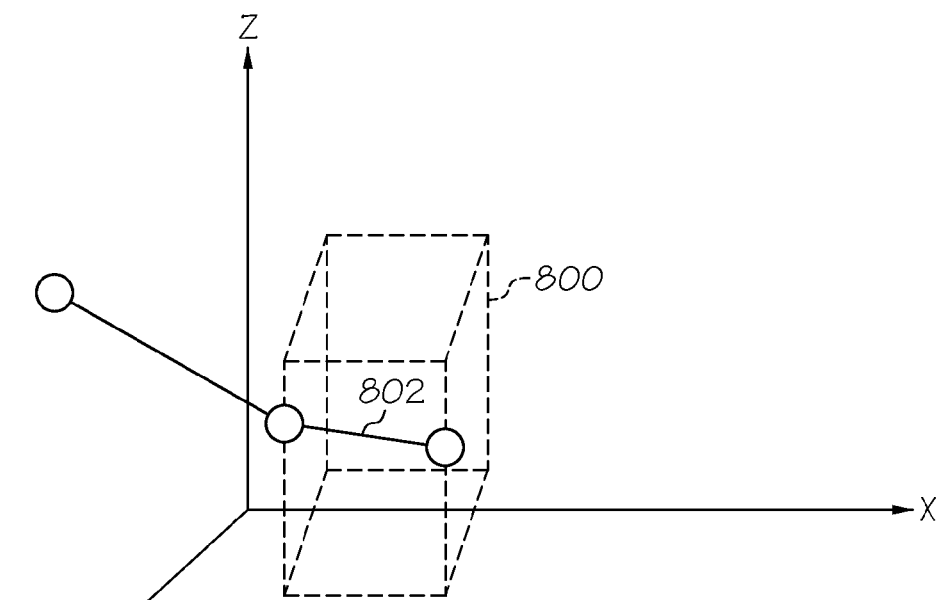
FIG. 8 is an illustration showing an estimated ergonomic hand position generated by the 3D gesture interaction interface.

FIG. 8 is an illustration showing an estimated ergonomic hand position generated by the 3D gesture interaction interface, utilizing the above described normalized arm anthropometry model and the above described chair model. The normalized palm "portion" 802 is shown within a calculated palm ergonomic movement volume 800. As described hereinbelow, static and dynamic features of the palm and fingers are recognized during gesture interaction with the 3D gesture interaction interface. The 3D gesture interaction interface employs the normalized palm portion 802 in the generation of the valid interaction volume, and generation of the visual feedback, and in comparison to stored anthropometry models. Once the valid interaction volume is generated based upon the normalized palm portion 802, the user may accept the visual feedback and begin gesture interaction therefrom (automatic mode), or the user may provide gesture feedback to adjust the valid interaction volume according to user preferences (pilot initiated mode).

Figure 9:
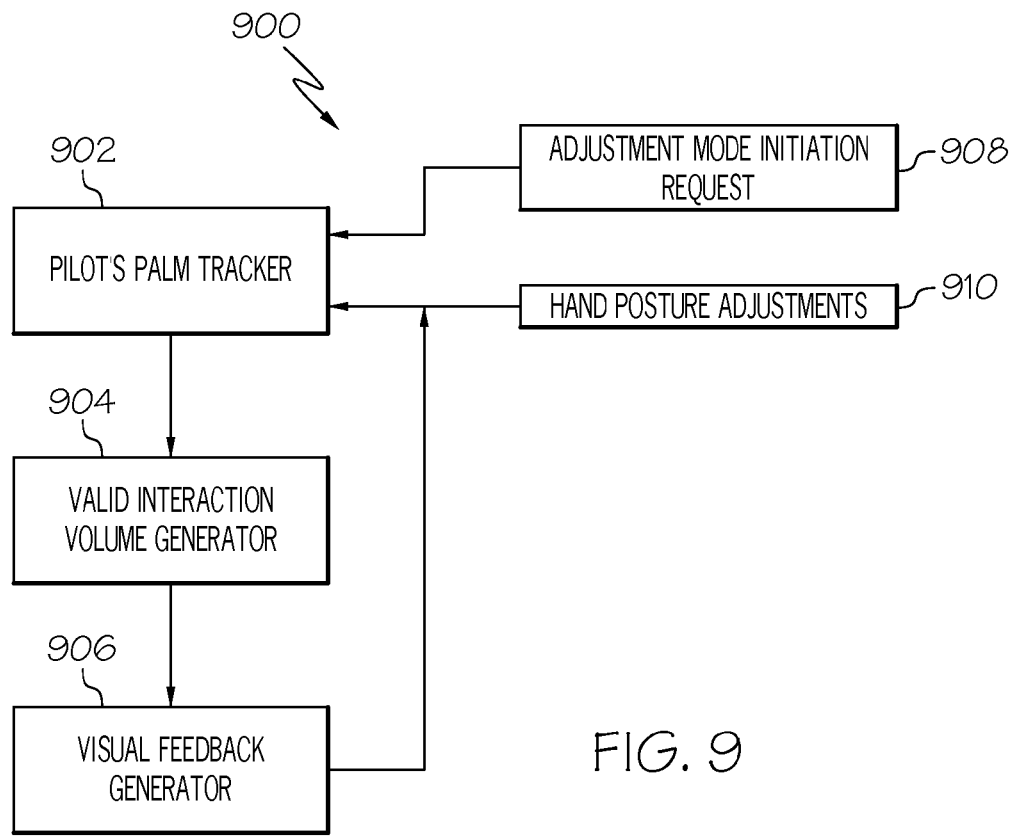
FIG. 9 is a generalized block diagram for a pilot initiated mode of construction of a valid interaction volume.

FIG. 9 is a generalized block diagram 900 describing the pilot initiated mode of construction of a valid interaction volume. An adjustment mode initiation request 908 such as a gesture or a button-press is received by the pilot's palm tracker at a first input thereof and, the pilot's palm tracker 902 receives the pilot's hand posture adjustments 910 which are sensed from one or more sensors, such as sensor 402 in FIG. 4. The pilot's palm tracker 902 drives the valid interaction volume generator 904, which, in turn, drives the visual feedback generator 906. The valid interaction volume generator 904 generates a volume substantially around the user's hand that is used to interpret hand movements as intentional gestures (see, for example, valid interaction volume 406 in FIG. 4). In adjustment mode, the valid interaction volume generator 904 tracks the palm and determines valid interaction volume for a given user's seating position. The visual feedback generator 906 drives one or more display devices to display images and/or symbology. In adjustment mode, the volume and wire frame of palm (as shown in FIG. 10) is displayed as visual feedback to the pilot; these elements are made invisible when pilot exists the adjustment mode either through a special gesture or hard button press.

Figure 10:
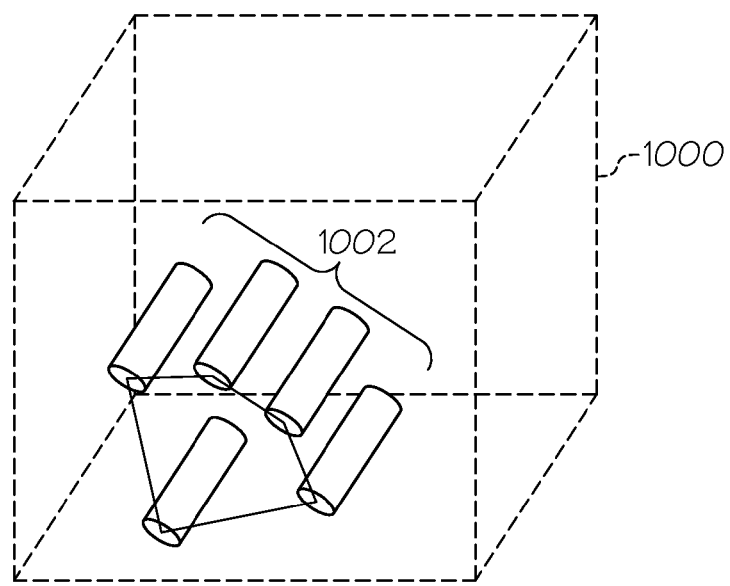
FIG. 10 is an illustration of visual feedback of a palm and fingers within a gesture interaction volume.

FIG. 10 illustrates visual feedback of a palm and fingers within a gesture interaction volume 1000. This visual feedback may be generated during the pilot initiated mode of constructing a valid interaction volume. A symbolic representation of the pilot's palm and fingers is displayed 1002. During gesture recognition, the pilot's palm and fingers are tracked in real-time. As the gesture is performed, aspects of the static and dynamic features of the palm and fingers are compared to rules in the three dimensional gesture interaction model, and recognized as whole or partial intentional gesture input where appropriate. The whole and partial intentional gestures are compared to a gesture interaction model, which parses and combines intentional gesture input into components of a complete gesture in this manner. The components of a complete gesture are described in more detail below. The complete gestures are compared to system command descriptors prior to generating associated system commands.

Figure 11:
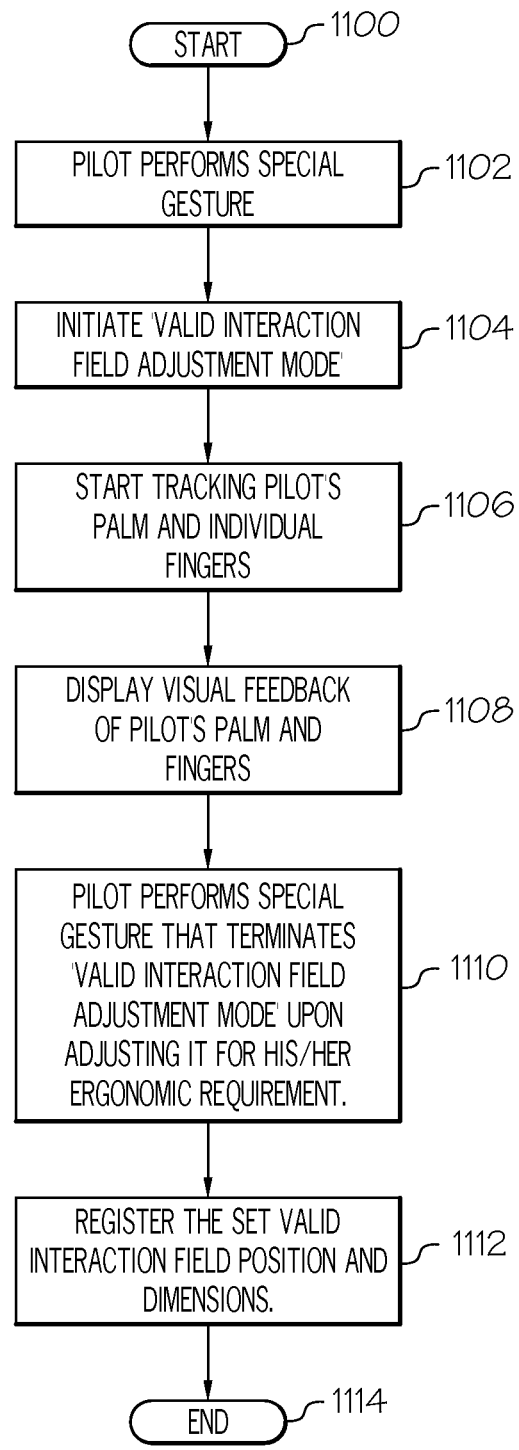
FIG. 11 is flow chart of the pilot initiated mode of construction of a valid interaction volume.

FIG. 11 is flow chart 1100 of the pilot initiated mode of construction of a valid interaction volume. Flow chart 1100 references various gesture components, such as entry point gestures and stop gestures, which are described in further detail below. The pilot performs a special entry point gesture (STEP 1102), that initiates a "valid volume adjustment mode" (STEP 1104). The system then begins tracking the pilot's palm and individual fingers (STEP 1106), and displaying real-time visual feedback of the pilots' palm and fingers (STEP 1108), as illustrated in FIG. 10. As described above, the pilot is able to view the visual feedback and make adjustments. When the pilot has satisfactorily customized the valid interaction volume according to preference, the pilot performs a special stop gesture that terminates the "valid volume adjustment mode" at STEP 1110. Upon the termination of "valid volume adjustment mode," the volume position and dimensions are registered by the system at STEP 1112. A valid 3D gesture recognition volume is then generated according to the pilot's preferences, and the adjustment is ended (STEP 1114). Once the user has adjusted the gesture recognition volume according to preferences for comfort and posture, the user may begin to operate the aircraft with valid gestures, defined herein as gestures that have features matching rules in the 3D gesture interaction model.

Figure 12:
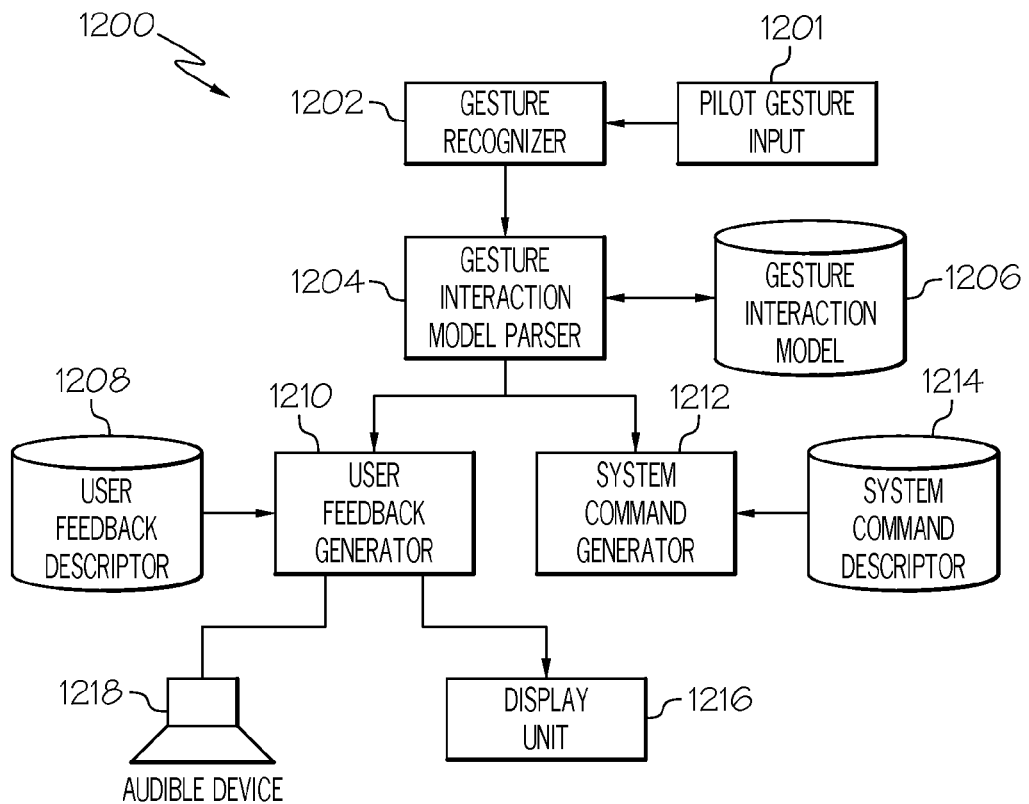
FIG. 12 is a detailed block diagram of a 3D gesture interaction model system.

FIG. 12 is a detailed block diagram of a 3D gesture interaction model system 1200. System 1200 includes gesture recognizer 1202, gesture interaction model memory device 1206, gesture interaction model parser 1204, and a user feedback generator 1210. Also included in system 1200 are system command generator 1212, a user feedback descriptor memory device 1208, and a system command descriptor memory device 1214.

Gesture recognition is initiated upon the matching of conformal cues corresponding to the pilot's intent to use 3D gestural interaction. If pilot gesture input 1201 is within a previously computed valid interaction volume, gesture recognizer 1202 generates, for valid gesture input, associated gesture ID and Validity Quality data. The Validity Quality data is a variable used to indicate gesture recognition success; i.e. system designers may adjust Validity Quality, for example, to indicate how the gesture is being performed with respect to the computed valid interaction volume. Another use of Validity Quality may be as a filter to improve interaction integrity for a select few critical gesture inputs, in which case all non-critical gesture inputs may be ignored.

The gesture interaction model in memory device 1206 stores the 3D gesture interaction rules containing individual gesture components (e.g. entry point, gesture start, gesture body, and gesture end); each gesture component may have definite preconditions, visual and aural feedback, and a next expected gesture component as shown below in FIG. 14. The gesture interaction model provides 3D gesture interaction rules for each system command that is supported by gesture interaction.

Gesture interaction model parser 1204 receives gesture ID and Validity Quality from the gesture recognizer 1202, parses the gesture into components and compares the components to rules in the gesture interaction model stored in memory device 1206. In this manner, gesture interaction model parser 1204 identifies and validates the user's interaction intentions, and supports the user feedback generator 1210 and the system command generator 1212. User feedback generator 1210 generates visual and aural user feedback. The system command generator 1212 obtains data from the gesture interaction model parser 1204, compares that data to data from the system command descriptors in memory device 1214, and generates a corresponding system commands.

The user feedback generator 1210 obtains data from the gesture interaction model parser 1204 and drives at least one display unit 1216 and may drive one or more audible devices 1218. The user feedback generator 1210 is the source of data for gesture pointers, UI element affordances, symbolic representations of the user's hand, and the like. A gesture pointer is a visual display of a pointer that corresponds to either a UI element (discussed hereinbelow), or the user's gesture hand and individual fingers. The gesture pointer functionality provided by user feedback generator 1210 also resolves gesture pointers corresponding to two different users by providing unique visual cues to help corresponding users relate to the pointer associated with them. For example, if both a captain and first officer are sharing the same display while using gesture interaction, one gesture pointer may be displayed as a filled circle and one may be displayed as a circle with a triangle within it.

The pilot may be focused on objects on a display and be performing display context dependent gestures, or the pilot may be focused elsewhere, wherein gesture mode is activated by performing gestures in a display context independent manner. As described herein, display context dependent refers to those gesture interactions corresponding to User interface elements projected upon or by multifunction displays (MFDs), near to eye (NTE), projection displays, or the like. A user interface (UI) element may be a knob, switch or the like. As such, "display context" means that the visual representation of the UI element appears to the user as an object on the cockpit display. A gesture is referred to as "display context dependent" when the gesture is intended to adjust a UI element that appears to the user as an object on the display. To adjust the UI element safely, it must first be locked. The UI element is locked by moving the gesture performing fingers with specific motion dynamics matching a 3D gesture interaction rule associated with locking. When the UI element is "locked," all subsequent gestures performed by the user are assumed to be intended for, and therefore routed to, the locked UI element. The user may then unlock the UI element by moving the gesture performing fingers with specific motion dynamics matching another 3D gesture interaction rule, a "stop" gesture. The UI element lock mechanism prevents accidental control function activation due to turbulence, as it requires specific gesture dynamics to lock and unlock each UI element.

One or more UI element may be locked. For every UI element, there is one or more affordances associated that allow the user to accomplish a task. For example, the task of scrolling up and down is an affordance associated with a scroll list. UI element affordance visual feedback 1220 may be displayed on the UI element appropriately to help the user recall the gestures associated with a corresponding UI element. Affordances are displayed for only those UI elements that are locked for interaction.

Figure 13:
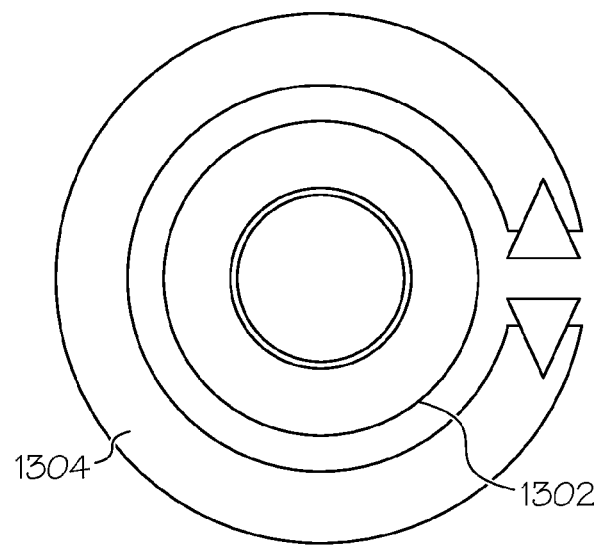
FIG. 13 is an illustration of a user interface (UI) element overlaid with an associated UI element affordance.

FIG. 13 is an illustration of a UI element 1302 overlaid with an associated UI element affordance 1304. The exemplary UI element may be projected on one or more displays as described above. UI element 1302 is a knob, and the up/down arrows are the visual display of the associated affordance.

Figure 14:
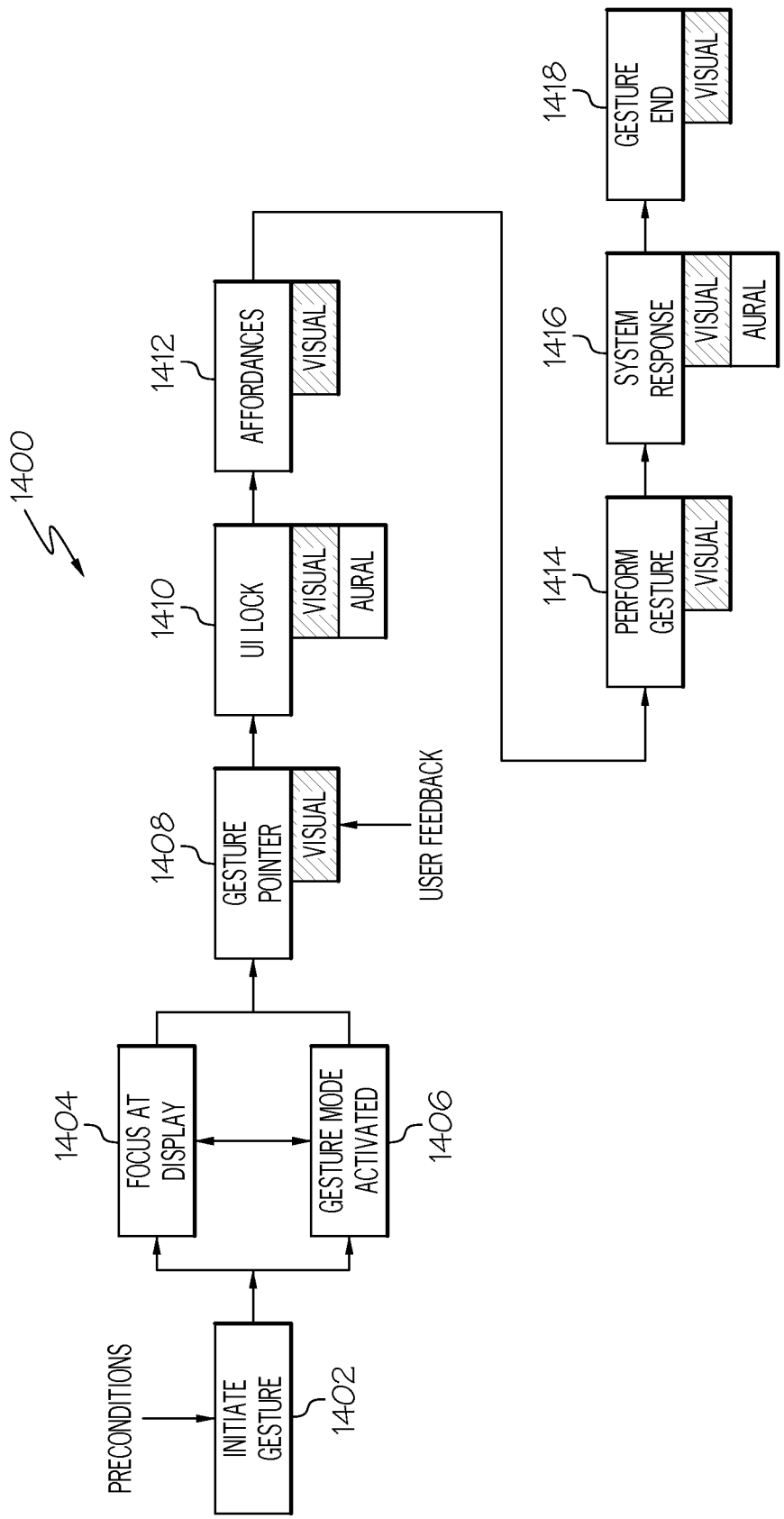
FIG. 14 is an illustration of the 3D gesture interaction model.

FIG. 14 is an illustration of the 3D gesture interaction model descriptor 1400 for display context oriented gesture interaction. This model can also be derived for display context independent gesture interaction. Preconditions are necessary for some of the states in the 3D gesture interaction model descriptor 1400 (hereinafter referred to as "states"). Initiation of the 3D gesture interaction model descriptor requires a precondition that the pilot's interacting hand to be within a valid gesture input field and a precondition of meeting specific palm static and dynamic properties to initiate gesture interaction mode. For more detailed information regarding gestures, see the gesture design section hereinbelow.

The first state of the interaction model, initiate gesture 1402, is initiated upon recognition of conformal cues corresponding to the pilot's intent to use 3D gestural interaction. The pilot may be focused on objects on a display 1404, and be performing display context dependent gestures, or the pilot may be focused elsewhere, wherein gesture mode is activated 1606 by performing gestures in a display context independent manner. As described hereinabove, display context dependent refers to those gesture interactions corresponding to multifunction displays (MFDs), near to eye (NTE), projection displays, or the like.

The gesture pointer state 1408 requires the precondition that gesture mode has been activated as described hereinabove. In this state, a gesture pointer is visually display that tracks interacting features (single pointer, double pointer, or triple pointer) based upon the UI element or gesture being performed. This state may resolve gesture pointers coming from two different users by providing unique visual cures to help corresponding users to relate which pointers are associated to them.

In the case of relying on a UI element, the UI lock 1410 may occur, which may be accompanied by visual and/or aural feedback to the user. Affordances associated with the UI element that has been locked in UI lock 1410 may be displayed at the affordances 1412 state.

The perform gesture 1414 state requires the precondition that the gesture mode is enabled, and, for UI elements, the precondition that the UI element is locked. In this state, the user gestures and the system processes the corresponding task. While the user is performing the gesture input, conformal visual feedback is provided. For UI elements, if the UI element is locked, all subsequent user gestures are processed for the UI element affordance until a recognized stop gesture is processed. Upon detection of a completed gesture, or stop gesture, corresponding to one of the associated affordances, the UI element is automatically unlocked.

In the system response 1416 state, visual and/or aural feedback may be provided to reflect the successfully recognized, and completed, gesture. In gesture end 1418, visual feedback indicates the successfully completed gesture.

Gestures can be broken into semantic components referred to as gesture components. A complete gesture may comprise one or more gesture components; the rules that define gesture components and their associations are generated by the 3D gesture interaction interface and stored as the 3D gesture interaction model. The associated rule may require that preconditions exist for a gesture component. The initial most component of an impending gesture is referred to as the "entry point". The entry point must meet minimum static and dynamic requirements to initiate the 3D gesture interaction interface's gesture mode. The controllable entry point requirements may be utilized for validating gesture intentionality and for the rejection of spurious gestures having identical static and dynamic features as one of the valid gestures. Immediately after the entry point, the gesture starts.

The gesture starts with a "start gesture," and then the gesture's main semantic portion begins. The main semantic portion is hereinafter referred to as the "gesture body". The gesture body of a "symbolic gesture" has a complete profile of static and dynamic properties; for symbolic gestures, gesture recognition success is based upon the receipt of the completed gesture body. In contrast, some gestures are continuous or "tracked gestures", in which the gesture body acts as a motion reference and may not reach its completion. The gesture recognition success of a tracked gesture is evaluated in real time, and is based upon meeting specific dynamics requirements. A "gesture end" component may be part of the gesture body, such as in a continuous gesture, or may be a separate component, such as in a symbolic gesture.

All gesture components, whether symbolic or tracking, have a minimum dynamic performance. The minimum dynamic performance provides robustness by reducing accidental gesture input. The 3D gesture interaction interface utilizes gesture dynamics in the generation of the gesture pointer's dynamic characteristics. A system command, task, or system application may be generated by grouping various complete gestures and/or gesture components into component groups.

Use Cases

A user may interact with the 3D gesture interaction interface in various ways. To assist understanding, the following non-exhaustive examples are provided.

1. Gesture Move-Pan. This is a gesture example of browsing through a navigation display at a fixed selected range.
    a. User: Perform pointing gesture with one or two fingers.
    b. User: Make visual contact with the navigation display.
    c. System: Acknowledge gesture mode.
    d. User: Move the pointing portion of palm in the desired direction.
    e. System: Moves the map with appropriate dynamic scaling factor. This factor is responsible for actual pan dynamics (velocity, acceleration and distance of map movement) with respect to pan gesture.
    f. User: Bring back the gesture head to (substantially) neutral position to initiate subsequent gesture.

The gesture head is the 3D region bounding the user's hand that performs gestures. For example, in a pointing gesture, a logical 3D region that encloses the user's finger or group of fingers is a gesture head. The gesture recognition system tracks this gesture head and moves the gesture pointer accordingly.

2. Gesture Move-Hold-Pan
   a. User: Perform pointing gesture with one or two fingers.
   b. User: Make visual contact with the navigation display.
   c. System: Acknowledge gesture mode.
   d. User: Upon (c), move the gesture head to the desired direction.
   e. System: Starts moving the map according to the gesture head orientation entered in (d).
   f. User: Holds gesture head to (substantially) same position.
   g. System: Continues moving the map in the prescribed direction with constant velocity. This velocity is configurable. It could be either constant system parameter or it could be directly proportional to the dynamic properties of input gesture.
   h. User: Performs "tap" gesture.
   i. System: Stops moving the map.
3. Change Map Range
   a. User: Perform pointing gesture with one or two fingers.
   b. User: Make visual contact with the navigation display.
   c. System: Acknowledge gesture mode.
   d. User: Start clockwise or counterclockwise gesture.
   e. System: Confirms input gesture after at least 60% of the complete expected circular cycle.
   f. System: After confirmation of circular cycle according to (e), change map range according to gesture.
   g. User: Continue with gesture until desired range is achieved.
4. Waypoint Selection—This navigation example may be used to snap the gesture pointer to the next available interactive element in the direction of the gesture movement.
   a. User: Perform pointing gesture with one or two fingers.
   b. User: Make. visual contact with the navigation display.
   c. System: Acknowledge gesture mode.
   d. User: Move the gesture head in the desired direction.
   e. System: Display the gesture pointer.
   f. User: Move the gesture head toward target waypoint.
   g. System: Highlight the fixed waypoint (or visual/aural feedback).
   h. User: Perform "tap" gesture while the waypoint is highlighted.
   i. System: Give visual/aural feedback as appropriate.
5. Direct to (destination)
   a. User: Press "talk" to speak.
   b. User: Speak the "direct to" destination.
   c. System: Direct to function feedback (visual). The gesture recognition system visually acknowledges that Direct To command is activated, and is waiting for pilot's input for waypoint to which direct to is to be executed. The visual feedback may be a "Direct To" label being displayed on a dedicated area on the navigation display, or may be a label floated on the display with a predefined offset while the user's eye gaze is tracked, so that the label does not occlude any actual objects being seen by pilot during location of the target waypoint.
   d. User: Make pointing gesture.
   e. User: Make visual contact with the navigation display.
   f. System: Acknowledge gesture mode.
   g. System: Display the gesture pointer.
   h. User: Move the gesture head toward target waypoint.
   i. System: Give visual/aural feedback for waypoint fixation.
   j. User: Perform "selection" gesture either through single or double "tap".
   k. System: visual/aural feedback that the Direct To operation is completed.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for operating an aircraft, the method comprising:
   detecting, with respect to a sensor volume generated by a sensor, (i) a position and location of a chair from a flight deck dashboard, and (ii) a position and location of an arm-rest from the flight deck dashboard;
   retrieving a chair model from a memory device, wherein the chair model comprises a chair coupled to an arm-rest, a height of the arm-rest, and a length of the arm-rest extending past an elbow contact point;
   retrieving normalized arm anthropology models comprising (i) a normalized angle between a hand at a neutral position and the arm-rest, (ii) a normalized arm and arm-rest intersection point, and (iii) a normalized arm length from the arm and arm-rest intersection point, from the memory device;
   detecting, within the sensor volume, gestures performed by a user's palm and fingers;
   generating, based on the chair model, the normalized arm anthropology models, and the position and location of (i) the chair and (ii) the arm-rest, a palm ergonomic movement volume;
   generating, based on the palm ergonomic movement volume, a valid interaction volume substantially surrounding the user's palm and fingers, the valid interaction volume being smaller than, and located within, the sensor volume;
   recognizing when a gesture performed is within the valid interaction volume and indicates a valid gesture input; and
   generating an associated system command based on the valid gesture input.

2. The method of claim 1, wherein generating a valid interaction volume further comprises:
   sensing the position of the user's palm and fingers within the valid interaction volume; and analyzing at least one of a length of the arm-rest, a height of the arm-rest, an angle between the arm-rest and an arm, a palm end point, a palm bottom joint, an elbow-arm-rest contact point, and a chair location.

3. The method of claim 1, wherein recognizing when a gesture performed within the valid interaction volume indicates a valid gesture input comprises:
generating a three dimensional gesture interaction model comprising a plurality of rules, wherein the rules comprise one or more valid gesture components;
distinguishing, during a gesture made within the valid interaction volume, static and dynamic features of a palm and fingers;
parsing the static and dynamic features of the palm and fingers; and
comparing the static and dynamic features of the palm and fingers to rules defined in the three dimensional gesture interaction model.

4. The method of claim 3, wherein the step of comparing comprises:
grouping one or more parsed features into component groups based upon the three dimensional gesture interaction model.

5. The method of claim 4, further comprising:
obtaining user feedback descriptors from a source of user feedback data;
comparing component groups to user feedback descriptors; and
generating visual and aural user feedback.

6. The method of claim 5, wherein the step of generating visual feedback comprises:
generating a gesture pointer; and
displaying the gesture pointer on a display unit.

7. The method of claim 5, wherein the step of generating visual feedback comprises:
generating a three dimensional image representative of the user's palm and fingers based upon the task; and
displaying the three dimensional image on a display unit.

8. The method of claim 5, wherein the step of generating visual feedback comprises:
generating an image representative of a user interface element with at least one associated affordance; and
displaying the image on a display unit.

9. The method of claim 4, further comprising:
obtaining system command descriptors from a source of system command data; and
comparing component groups to system command descriptors.

10. A volumetric computing system for an aircraft, comprising:
a chair coupled to an arm-rest;
a sensor generating a predetermined sensor volume;
a display device; and
a processor coupled to the chair, the sensor, and the display device, the processor configured to
(a) detect, within the predetermined sensor volume, (i) a position and location of the chair from a flight deck dashboard, and (ii) a position and location of the arm-rest from the flight deck dashboard;
(b) retrieve a chair model from a memory device, wherein the chair model comprises a chair coupled to an arm rest, a height of the arm-rest, and a length of the arm-rest extending past an elbow contact point;
(c) detect, within the predetermined sensor volume, gestures performed by a user's palm and fingers;
(d) generate, based on the chair model, the position and location of the chair and the arm-rest, and normalized arm anthropology models comprising (i) a normalized angle between a hand at a neutral position and an arm-rest, and (ii) a normalized arm length from an intersection point of an arm and the arm-rest, a valid interaction volume substantially surrounding the user's palm and fingers, the valid interaction volume being smaller than, and located within, the sensor volume;
(e) recognize when a detected gesture performed is within the valid interaction volume and indicates a valid gesture input; and
(f) generate an associated system command based on the valid gesture input.

11. The system of claim 10, wherein the processor is further configured to:
sense the position of the user's palm and fingers within the predetermined sensor volume; and
analyze at least one of a length of the arm-rest, a height of the arm-rest, an angle between the arm-rest and an arm, a palm end point, a palm bottom joint, an elbow-arm-rest contact point, and a chair location.

12. The system of claim 10, further comprising:
a source of three dimensional gesture interaction model data, wherein the source of model data is coupled to the processor, and wherein the model data comprises a plurality of rules associated with one or more valid gesture components; and
wherein the processor is further configured to (a) distinguish, during a gesture made within the valid interaction volume, static and dynamic features of a palm and fingers; (b) parse the static and dynamic features of the palm and fingers; and (c) compare the parsed features to rules defined in the three dimensional gesture interaction model.

13. The system of claim 12, further comprising:
an audible device coupled to the processor; and
a source of user feedback descriptor data coupled to the processor;
wherein the processor is further configured to generate visual feedback on the display device and to generate aural feedback on the audible device; and wherein the generation of the visual and aural feedback are based on the user feedback descriptor data.

14. The system of claim 12, further comprising:
a source of system command descriptor data coupled to the processor
wherein the processor is further configured to generate system commands based on the user system command descriptor data.

15. A method for operating an aircraft, the method comprising:
positioning, with respect to at least one sensor, an arm-rest that is coupled to a chair;
constructing a predetermined sensor volume based on the position and location of the chair from a flight deck dashboard, the position and location of the arm-rest from the flight deck dashboard, and the at least one sensor;
generating, based on
(a) normalized arm anthropology models comprising (i) a normalized angle between a hand at a neutral position and an arm-rest, and (ii) a normalized arm length from an intersection point of an arm and the arm-rest,
(b) chair models comprising a height of the arm-rest and a length of the arm-rest extending past an elbow contact point, and (c) the position and location of the chair and arm rest measured from a flight deck dashboard, relative to the predetermined sensor volume, a valid interaction volume substantially surrounding a user's hand, the valid interaction volume being smaller than, and located within, the predetermined sensor volume;

analyzing static and dynamic movements of a user's palm and fingers within the valid interaction volume;

recognizing when the static and dynamic movements of the user's palm and fingers within the valid interaction volume indicate a valid gesture input; and generating an associated system command based on the valid gesture input.

16. The method of claim 15, further comprising:

sorting valid gesture input into at least one of (a) gesture entry point, (b) gesture start, (c) gesture body, and (e) gesture end.

17. The method of claim 16, wherein the step of sorting further comprises:

evaluating gesture recognition success based upon the gesture body.

\* \* \* \* \*